United States Patent [19]

Spulgis

[11] 3,881,899
[45] May 6, 1975

[54] PNEUMATIC APPARATUS FOR EMPTYING PARTICULATE FILTERS

[75] Inventor: Ivars Sigurds Spulgis, Columbus, Ohio

[73] Assignee: Pennwalt Corporation, Philadelphia, Pa.

[22] Filed: Apr. 8, 1974

[21] Appl. No.: 459,154

Related U.S. Application Data

[63] Continuation of Ser. No. 346,522, March 30, 1973, abandoned.

[52] U.S. Cl. .................................................. 55/387
[51] Int. Cl. ........................................... B01d 53/04
[58] Field of Search ............. 55/71, 73, 74, 75, 179, 55/387

[56] References Cited
UNITED STATES PATENTS 2,726,137    12/1955    Davis ........................................ 55/79
3,694,037    9/1972    Feder ....................................... 302/22
3,795,090    3/1974    Bainebey .................................. 55/387

*Primary Examiner*—Charles N. Hart
*Attorney, Agent, or Firm*—Charles N. Quinn

[57] ABSTRACT

Apparatus for withdrawing particulate adsorptive material from a rechargeable filter includes a well having an exhaust and return conduits coupled to a pneumatic conveyor system. The lower end of the filter has a downspout projecting into the well and adjacently spaced from the floor thereof whereby the granular material falling upon the floor through the spout causes clogging thereof as the angle of repose of the pile of granules reaches the end of the spout. The pneumatic conveyor sweeps the pile away to permit additional granules to fall.

3 Claims, 5 Drawing Figures

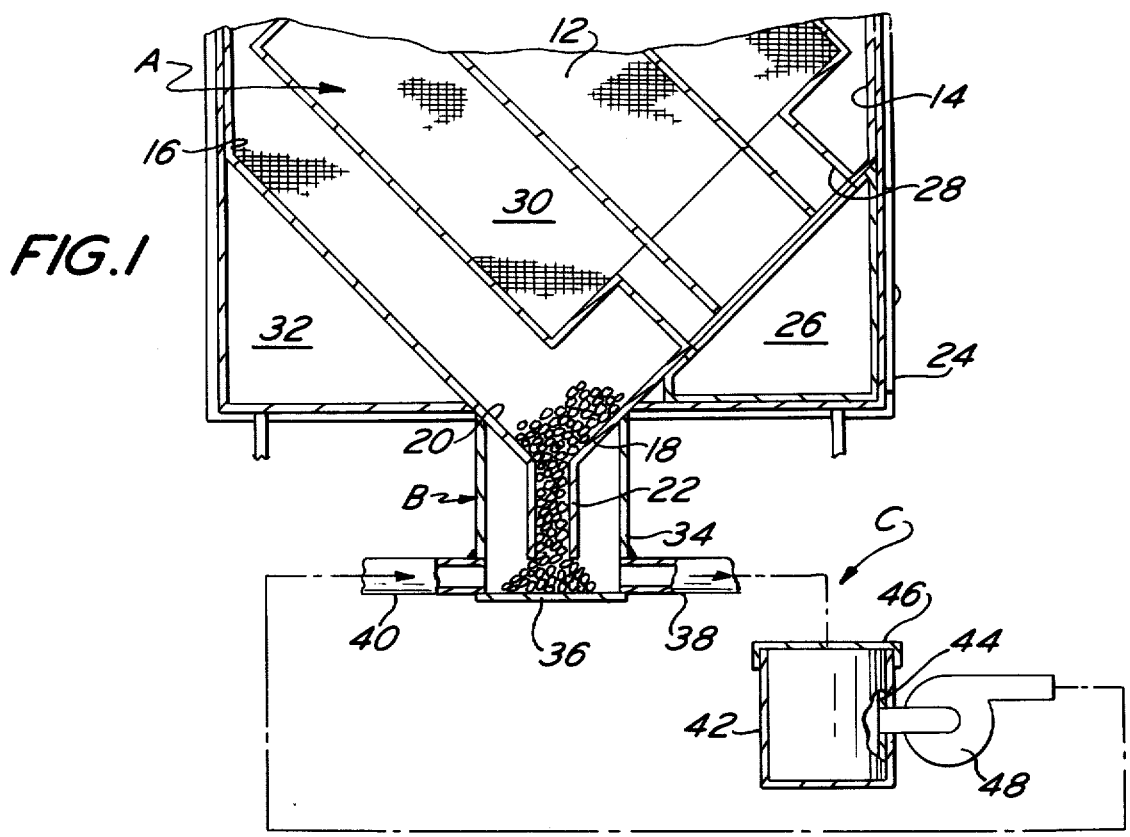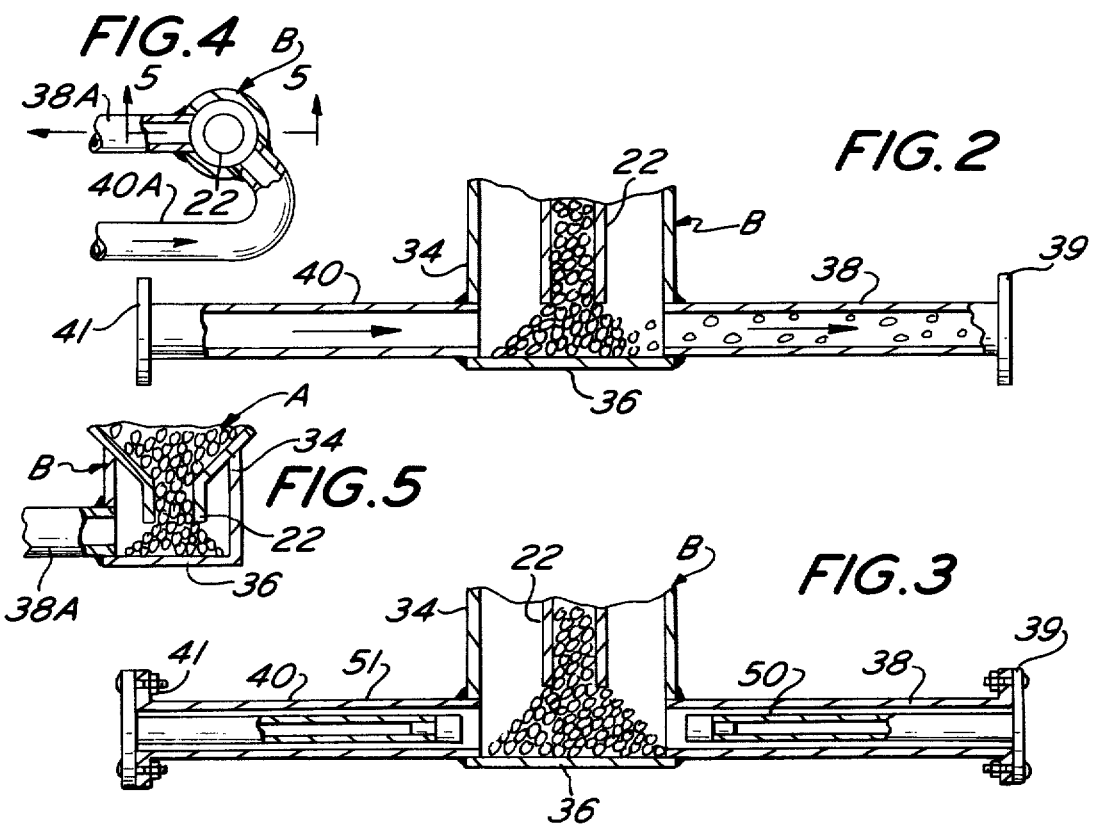

PNEUMATIC APPARATUS FOR EMPTYING PARTICULATE FILTERS

This is a continuation, of application Ser. No. 346,522, filed Mar. 30, 1973, and now abandoned.

This invention relates to a rechargeable particulate filter such as that employed for adsorbing radioactive contamination in a gas stream, and more particularly relates to an apparatus which permits loading and unloading of the particulate granules in a closed loop without subjecting personnel to exposure from radioactivity.

While vacuum system pneumatic conveyors have been used in the past for withdrawing particulate material from a bin or the like by inserting a suction tube into the pile of granules, it is apparent that such a "probe" type arrangement cannot be employed when the granules are radioactive. Furthermore, where a suction probe tube is inserted into a pile of particulate matter, there is a likelihood for the granules to bridge over the end of the tube and clog the line.

In prior patent application Ser. No. 317,434, filed Dec. 21, 1972, there is shown and described a radioactive gas standby treatment apparatus with a high efficiency rechargeable particulate filter for adsorbing the radioactive contaminants. The prior application also illustrated and described a pneumatic system for emptying the particulate granules by means of an inverted cup aspirator in which the granules were sucked up into the cup from a well enclosing the lower end of the filter bed.

While the foregoing inverted-cup aspiration design provided a closed system which safeguarded personnel, because the well became substantially filled when the filter was loaded, there could be a possibility of clogging the pneumatic exhaust line under certain conditions.

The present invention utilizes a downspout which is coupled to a funnel at the lower portion of the filter and projects into a closed well. The lower end of the downspout is adjacently spaced from the floor of the well such that the granules of particulate material in the filter fall through the spout and form a pile on the well floor. When the angle of repose of the pile reaches the end of the downspout, the latter becomes effectively plugged and permits the filter to be loaded. A closed loop pneumatic conveyor coupled to the well by means of a suction and return line allows the pile to be swept from the floor whereby the downspout is unplugged and enables the filter to be emptied.

It is therefore an object of this invention to provide a pneumatic apparatus for emptying particulate filters in a closed loop system without being subject to clogging.

Another object of this invention is to provide a pneumatic conveying apparatus for emptying radioactive adsorbtive particulate from rechargeable filters without exposing personnel to radioactive contamination.

A further object of this invention is to provide an integral pneumatic emptying system for a rechargeable particulate filter wherein the contents of the filter may be emptied at a controlled withdrawal rate.

Other objects of this invention are to provide an improved device of the character described that is easily and economically produced, sturdy in construction; and highly efficient and effective in operation.

With the above and related objects in view, this invention consists of the details of construction and combination of parts as will be more fully understood from the following detailed description when read in conjunction with the accompanying drawing in which:

FIG. 1 is a fragmentary sectional view of a particulate filter bed for adsorption of radioactive elements from a gas stream and having a pneumatic apparatus embodying this invention for emptying the radioactive particulate materials from the bed.

FIG. 2 is an enlarged sectional view thereof with the pneumatic system in operative dispostion withdrawing particulate from the bed.

FIG. 3 is a sectional view of the pneumatic apparatus in static condition for loading or working disposition of the bed.

FIG. 4 is a fragmentary view, and partly in section, of a modification of the pneumatic emptying system.

FIG. 5 is a sectional view taken along lines 5—5 of FIG. 4.

Referring now in greater detail to the drawing in which similar reference characters refer to similar parts, there is shown a rechargeable radioactive gas filter generally designated as A, the lower portion of which terminates in a well B that is adapted to be coupled to a pneumatic conveyor system C for withdrawing particulate adsorptive material from the bottom of the well.

The filter A is best shown in FIG. 1 and comprises a bed in the form of a cage having opposed foraminous walls 12 lying parallel to the plane of the paper, sheet metal lateral walls 14 and 16, and a funnel-like bottom comprising lower sheet metal walls 18 and 20 which terminate and feed into a cylindrical spout or pipe 22. The detailed description of the filter design is set forth in prior application Ser. No. 317,434, filed Dec. 21, 1972, by Thomas Nelson Hickey and the inventor herein, Ivars Sigurds Spulgis. A plurality of the filter beds A are arranged in parallel spaced disposition within a housing 24 of generally rectangular configuration. An air stream containing radioactive contamination, such as elemental iodine and methyl iodide enters from an inlet plenum 26 and passes into a central chamber 30 in each cage through a mouth 28. The gas stream is then squeezed laterally under essentially laminar flow conditions through the cage of particulate adsorptive material and emerges into the spaces separating adjacent beds A. An exit manifold 32 coupled to the area spaces between the beds then directs the gas stream downstream for further treatment and later discharge to atmosphere.

Each bed A is an independent unit which is filled through a hopper port at the top (not shown) and the granular adsorptive material falls to the bottom until the pile of granules falling into the well B causes clogging of the spout 22. In the latter regard, the angle of repose of the particulate material, for example 8×16 mesh charcoal, determines the configuration of the pile at which stoppage of flow will occur. Charcoal of the above character has an angle of repose of approximately 30°. Thereafter, each bed is filled with the particulate adsorbent until the channel or chamber 32 is completely submerged within the cage of granules. Other adsorptive particulate may be certain granular silicaceous or resinous material.

The well B has a generally cylindrical side wall 34 substantially concentric with the downspout 22. A flat floor 36 is adjacently spaced from the lower end of the spout so that the pile of granules will be contained within the floor area. The upper edge of the well B is hermetically sealed by welding to base of the housing 24 about the funneling walls 18 and 20.

Oppositely disposed pipes 38 and 40 communicate with the interior of the well B, and the closed loop pneumatic eductor system C is adapted to be coupled to the pipes by way of end flanges 39 and 41. The pneumatic system C includes a tank 42 having a bag 44 suspended below the lid 46 of the tank. A blower turbine 48 adapted to operate at high velocity, for example 2,000 feet per minute, is coupled to the tank 42 such that air would be drawn through the lid 46 and out through the bag.

As is apparent, operation of the blower 48 would cause the air to be drawn into the pipe 38 from the well B and sweep the pile of granules lying on the floor 36 into the bag 44 with the return stream of air blowing through pipe 40 synergistically reinforcing the sweeping function. With the diminution of the pile of granules, further emptying of the filter cage can occur until the particulate contents of the filter bed A are exhausted. Thereafter, the hoses coupling the blower 48 to the pipe flanges 39 and 41 are removed, and plugs 50 and 51 are inserted within the respective pipes 38 and 40 to maintain the adsorbent particulate material secure in the well B.

In FIGS. 4 and 5, there is shown a modification of the manner in which the pipes are mounted to the well B. That is, the exhaust pipe 38A and the return pipe 40A are arranged in parallel configuration and are coupled to the well B at an obtuse angle with respect to each other whereby hose connections to the pneumatic suction system C can be made at the front of the filler A for example.

It is also possible to utilize concentric pipes (not shown) in which the outer annulus is used for withdrawing granular material from the well B while the inner pipe is utilized as a return from the pneumatic conveyor C.

Although this invention is described in considerable detail, such description is intended as being illustrative rather than limiting, since the invention may be variously embodied without departing from the spirit thereof, and the scope of the invention is to be determined as claimed.

What is claimed is:

1. A particulate filter for adsorption of radioactive contamination in a gas stream comprising, in combination:

a closed housing including an inlet therein for introducing the contaminated gas stream, at least one filter bed interposed in said housing transverse to the path of the contaminated gas stream, and an outlet through which decontaminated gas is discharged, each filter bed comprising (i) spaced perforate walls arranged within said housing and defining a chamber for receiving particulate absorptive material, (ii) a hopper at the upper portion of said chamber into which the particulate material is loaded, and (iii) evacuation means at the lower portion of said chamber for draining the particulate material therefrom when the adsorptive efficacy of said material is expended, said evacuation means including (a) a funnel downwardly projecting from said chamber and terminating in a vertically disposed spout, (b) a well enclosing at least the lower portion of said spout and having a floor spaced from the lower end thereof, (c) first and second conduits in communication with said well, (e) a closed tank coupled with said first conduit, (f) blower means coupling said second conduit with said tank in a closed path, and (g) a porous receptacle in said tank interposed in the path of travel through said conduits for collecting the spent particulate material, whereby the particulate material will fall to the floor of said well in a pile until the angle of repose thereof effects closure of the lower end of the spout, said evacuation means upon actuation of said blower means pneumatically sweeping the particulate material up from the pile in an entirely closed circuit such that radioactive contaminants are always retained in encapsulated disposition and never released into the environment.

2. The filter of claim 1 wherein said first and second conduits are coupled to diametrically opposed portions of said well.

3. The filter of claim 1 wherein the particulate material is finely divided activated charcoal.

* * * * *